Aug. 23, 1966    H. J. GERBER ET AL    3,268,785
PLURAL STEPPING MOTOR DRIVE
Filed June 12, 1964    4 Sheets-Sheet 1

INVENTOR.
HEINZ JOSEPH GERBER
JOHN L. SUMMERS
BY
McCormick, Paulding & Huber
ATTORNEYS Aug. 23, 1966 H. J. GERBER ET AL 3,268,785
PLURAL STEPPING MOTOR DRIVE
Filed June 12, 1964 4 Sheets-Sheet 2

Aug. 23, 1966  H. J. GERBER ET AL  3,268,785
PLURAL STEPPING MOTOR DRIVE
Filed June 12, 1964  4 Sheets-Sheet 3

United States Patent Office 3,268,785
Patented August 23, 1966

3,268,785
PLURAL STEPPING MOTOR DRIVE
Heinz Joseph Gerber, West Hartford, and John L. Summers, Rockville, Conn., assignors to The Gerber Scientific Instrument Company, Inc., South Windsor, Conn., a corporation of Connecticut
Filed June 12, 1964, Ser. No. 374,607
14 Claims. (Cl. 318—8)

This invention relates to devices, such as, for example, X–Y plotters, wherein a part is moved relative to another part and in a given coordinate direction in response to a train of electrical pulses each of which represents a definite displacement of the part, and deals more particularly with an improved stepping motor drive for such a device.

The device of the present invention is in many respects similar to the device illustrated and described in the co-pending application of Heinz Joseph Gerber, Serial No. 293,944, filed July 10, 1963, entitled Stepping Motor Drive. The latter application discloses a stepping motor drive in which the outputs of two or more stepping motors are combined through one or more differential mechanisms or other similar mechanical summing devices to provide an output motion for the final drive element. The use of differential mechanisms for summing the output of the stepping motors has certain advantages with regard to simplifying the logic system required for controlling the energization of the motors and also with regard to eliminating any need for aligning the motors relative to each other to prevent the output of one motor from interfering with or adversely affecting the output of another motor. Nevertheless, the differential mechanisms are relatively costly devices, and the general aim of the present invention is to provide a stepping motor drive which achieves generally the same advantages of the device shown in the above-mentioned patent application and which at the same time eliminates the need for differential mechanisms for summing the outputs of the various stepping motors.

A further object of this invention is to provide a stepping motor drive whereby two or more standard conventional stepping motors may be combined to produce a drive for a part having a much greater output power rating than each individual stepping motor, and wherein the means for combining the outputs of the stepping motors is of a simple construction and of low cost to manufacture.

A still further object of this invention is to provide a drive motor capable of accurately positioning relatively large parts at relatively high speeds in comparison to the prior art.

Another object of this invention is to provide a drive motor of the character mentioned in the preceding paragraph which is particularly useful in digital control systems.

Other objects and advantages of the invention will be apparent from the following description and from the drawings forming a part thereof.

The drawings show preferred embodiments of the invention and such embodiments will be described, but it will be understood that various changes may be made from the constructions disclosed, and that the drawings and descriptions are not to be construed as defining or limiting the scope of the invention, the claims forming a part of this specification being relied upon for that purpose.

Figure 1:
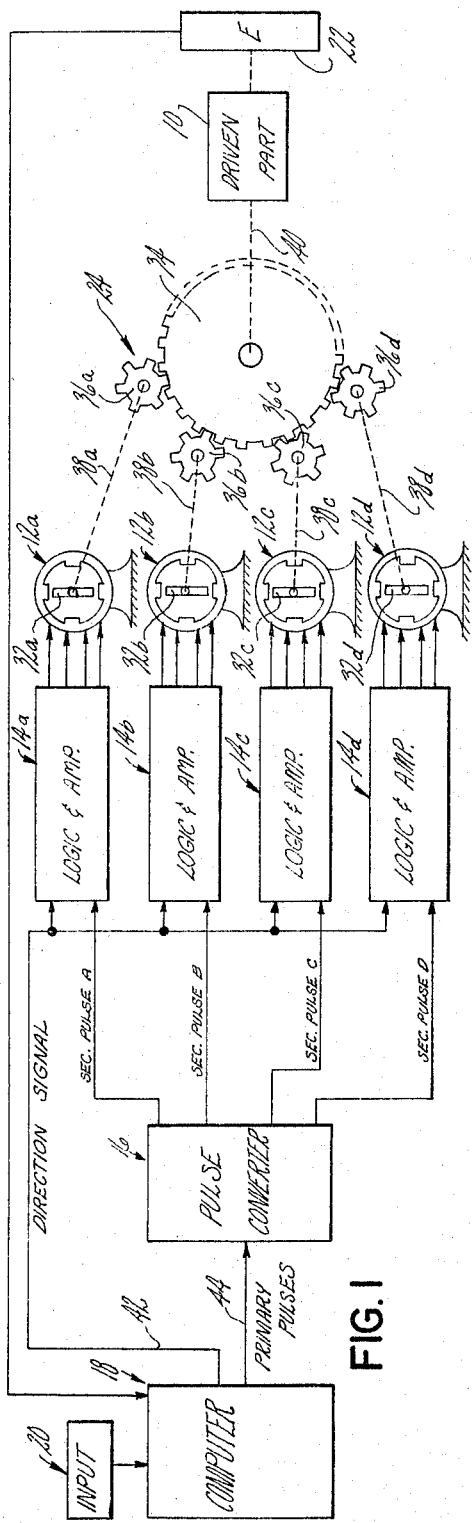
FIG. 1 is a schematic illustration in the form of a block diagram illustrating a stepping motor drive system embodying the present invention.

Turning now to the drawings, and first considering FIG. 1, this figure shows a stepping motor drive system for moving a given part which in the figure is represented by the reference numeral 10. The system shown in this figure may, for example, comprise the drive for one axis of a two axis plotter such as shown in the above-mentioned patent application Serial No. 293,944 and as also shown in the co-pending application of Gerber and Logan, Serial No. 228,289, filed October 4, 1962, and entitled "X–Y Plotter." In this case, the driven part 10 would constitute either the X carriage or the Y carriage of the plotter. It will be understood, however, that this invention is not limited to plotters and may be employed wherever precise positioning of a movable part is required.

In general, a stepping motor drive made in accordance with the present invention includes a plurality of stepping motors, the output members of which are mechanically joined to one another so as to move in unison with each other and with the driven part. The number of stepping motors may vary, but for the purpose of illustration four such motors are shown in FIG. 1 at 12a, 12b, 12c and 12d. Also included in the illustrated system are a plurality of logic and amplifier units 14a, 14b, 14c and 14d each respectively associated with one of the stepping motors, a pulse converter 16, a computer 18, an input device 20, an encoder 22, and means indicated generally at 24 for drivingly connecting the rotors of the stepping motors to one another and to the driven part 10.

Figure 6:
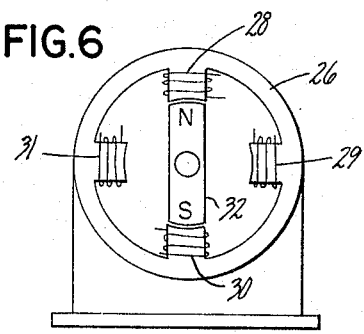
FIG. 6 is a schematic representation of a simple stepping motor of the type which may be used in the system of FIG. 1.
Figure 7:
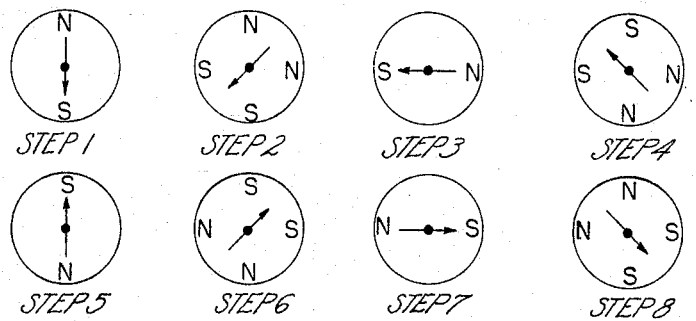
FIG. 7 is a schematic representation portraying the different states of energization of the coils of the stepping motor of FIG. 6 required to rotate the output shaft of the motor one full revolution.

Before discussing in more detail the operation of the system of FIG. 1, reference is made to FIG. 6 which shows schematically a simple stepping motor of the type which may be employed in the system of FIG. 1 and to FIG. 7 which shows one way in which the windings of such a motor may be sequentially energized to effect rotation of the rotor. In FIG. 6, the motor is shown to comprise a stator 26 including four salient poles, the stator having associated therewith winding means in the form of four separate windings 28, 29, 30 and 31 each received on a respective one of the salient poles. The rotor is shown at 32 and is permanently magnetized so as to have north and south poles as shown by the letters N and S respectively. By properly changing the state of the energization of the windings in one or another of two definite sequential patterns, the rotor 32 may be made to move, or at least urged to move, in either a clockwise or counterclockwise direction relative to the stator. The energization of the windings 28, 29, 30 and 31 is by direct current and depending on the direction of this current in each winding, the associated pole of the stator will be magnetized so as to have its end face provide either a north or a south magnetic pole.

FIG. 7 shows the step-by-step manner in which the states of energization of the windings of the stepping motor of FIG. 6 may be varied in order to cause one full revolution of the rotor 32. In this figure, and also in FIG. 3, the rotor of the motor is represented by an arrow with the head of the arrow representing the north pole of the rotor and with the tail of the arrow representing the south pole. Also, the salient poles of the stator are represented merely by the letters N and S which letters indicate the magnetic polarity of the salient pole end faces. That is, in step 1 of FIG. 7, the winding 28 is energized in such a direction as to provided a north magnetic pole at its stator pole end face and the winding 30 is so energized as to produce a south magnetic pole at its stator pole end face. The windings 29 and 31 are unenergized and therefore produce no magnetic poles. As a result of this magnetization of the stator, the rotor is urged to the vertical position shown in step 1. In step 2, both the winding 28 and the winding 29 are energized to produce north poles and the windings 30 and 31 are energized to produce south poles with the result that the rotor will be urged to the position shown in step 2 which is displaced 45° clockwise from the position shown in step 1. From FIG. 7, it will be further noted that by sequentially changing the states of energization of the windings in accordance with the pattern of steps shown, the rotor may be made to move in progressive 45° steps, eight steps being required to produce one full revolution of the rotor. It will also be appreciated that by reversing the sequence of the steps, the rotor may be made to move in the reverse or counterclockwise direction.

Stepping motors of the type shown and described in FIGS. 6 and 7 are well known in the art and the above discussion has been presented in order to more fully understand the system shown in FIG. 1. It will further be understood that the four pole stepping motor shown in FIG. 6 is a relatively simple stepping motor which has been, because of its simplicity, chosen for discussion purposes. The invention is, however, not limited to any particular type of stepping motor and in particular it should be noted that frequently stepping motors include many more poles than the four poles shown in FIG. 6 and accordingly require many more steps to complete a full revolution of the rotor. For example, one stepping motor adaptable for use in the system of FIG. 1 is the "Slo-Syn" motor manufactured by the Superior Electric Company of Bristol, Connecticut and described in paper 61-650 of the American Institute of Electrical Engineers, by Snowden and Madsen, entitled "Characteristics of a Synchronous Inductor Motor" and published in the March 19, 1962 issue of "Applications and Industry." By employing a different construction of the rotor, stator and windings from that shown in FIG. 6 of the present application, this motor may require as many as 200 or more switching operations or steps, depending on the particular design of the rotor and stator, to produce one full revolution of the rotor.

Returning now to FIG. 1, the motors 12a, 12b, 12c and 12d may be taken to be generally similar to the one shown in FIG. 6. The rotors of these motors are indicated at 32a, 32b, 32c and 32d. As mentioned previously, these rotors are drivingly connected for rotation in unison by a suitable connecting means 24, and in FIG. 1 this means is shown to comprise a first gear 34 which meshes with four secondary gears 36a, 36b, 36c and 36d each connected with a respective one of the rotors by a shaft or other drive means indicated respectively at 38a, 38b, 38c and 38d. In actual practice, for example, the parts 38a, 38b, 38c and 38d could be the shafts of the respective motors and the gears 36a, 36b, 36c and 36d could be gears mounted on these shafts and meshing with the gear 34, the gear 34 being rotatably supported relative to a housing or other base on which the motors may also be mounted. The gear 34 is in turn drivingly connected by a shaft or other suitable means 40 to the driven part 10 so that the driven part is moved in response to the rotation of the gear 34. The encoder 22 is also connected with and moved in unison with the driven part 10 so as to provide a position signal which is fed back to the computer 18.

The computer 18 serves to produce a train of primary pulses wherein the number of pulses is proportional to a desired displacement of the driven part 10. For example, each pulse appearing in the primary train of pulses issuing from the computer 18 may represent a desired 0.001 inch displacement of the driven part 10. The input device 20 may be a punched paper tape reader or other device which sequentially supplies the computer 18 with information concerning the various different points to which it is desired to move the driven part 10. After information concerning one point is fed into the computer 18 from the input 20, the computer compares this information with the present location of the driven part, as supplied by the encoder 22, and produces a train of primary pulses containing a number of pulses equal in number to the required displacement of the part divided by the displacement effected by each pulse. The computer 18 also produces direction signals which, as shown, are transmitted by a line 42 simultaneously to each of the logic and amplifier units, these directional signals serving to cause the logic unit to energize the associated motor windings in the proper sequence to obtain the desired direction of rotation. The computer 18 may take various different forms well known in the art and is shown by way of example only. In practicing the invention, various different means may be employed for providing the train of primary pulses.

The primary train of pulses, which appears on the line 44 is transmitted to the pulse converter 16. The pulse converter 16 may take various different forms well known in the art and may, for example, comprise a ring counter circuit, the purpose of the pulse converter being to convert the primary train of pulses into a plurality of secondary trains of pulses each transmitted to a respective one of the logic and amplifier units and each containing a number of pulses proportionately related to the number of pulses in the primary train, the pulses of the secondary trains being phase shifted from one another by a phase angle equal to 360° divided by the number of secondary trains. Preferably, and as shown, but not necessarily, the number of pulses in each secondary train is equal to the number of pulses in the primary train divided by the number of secondary trains.

Figure 2:
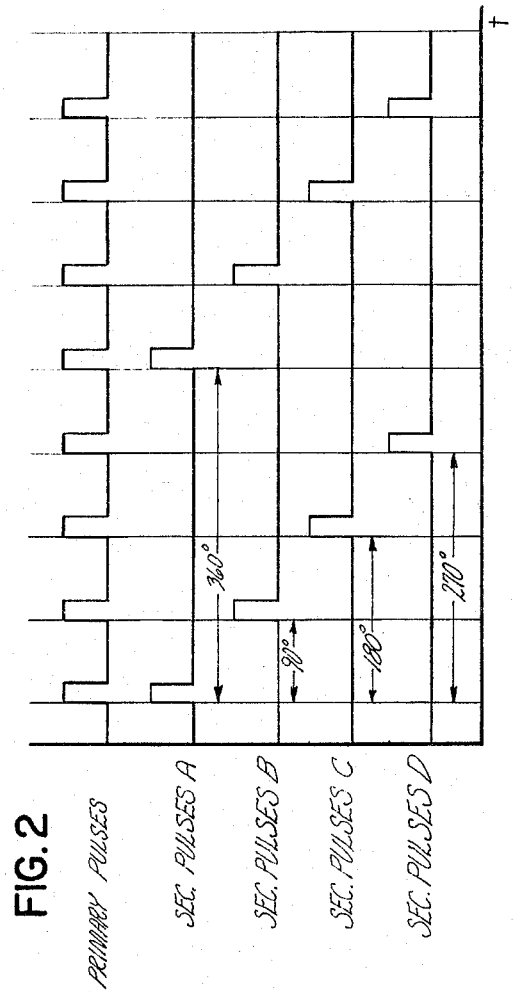
FIG. 2 is a graphic representation of the various trains of pulses employed in the system of FIG. 1.

For the system shown in FIG. 1, the time relationship between the primary and secondary trains of pulses is shown in FIG. 2. From this figure, it will be noted that each secondary pulse train includes one pulse for each four pulses in the primary train and further the pulses of the train B are 90° out of phase with the pulses of the train A, the pulses of the train C are 180° out of phase with the train A, and the pulses of the train D are 270° out of phase with the pulses of the train A. That is, the pulses of the various secondary trains are phase shifted from one another by 90° phase angles. The logic units and amplifiers 14a, 14b, 14c and 14d are therefore sequentially controlled by the various trains of secondary pulses. That is, assuming that each logic and amplifier unit is responsive only to the initial or rise portion of each received secondary pulse, the logic and amplifier units instead of being actuated simultaneously will be actuated in the order 14a, 14b, 14c, 14d, 14a, 14b, etc.

The various logic and amplifier units may consist of any of various different forms of circuitry well known in the art and by themselves constitute no part of this invention. Considering the logic and amplifier unit 14a as an example, this unit is operable in response to the secondary pulses of the train A to change the condition of the energization of the windings of the associated stepping motor 12a. Assuming that the motor 12a is similar to the motor shown in FIG. 6, the logic and amplifier unit 14a operates to energize the windings of the motor in a sequential step-by-step pattern such as shown in FIG. 7 to urge the rotor of the motor to move in one direction of rotation. The direction of rotation is controlled by the direction signal appearing on the line 42 which causes the logic unit 14a to energize the windings of the motor in either one sequential manner or in the reverse manner to cause the rotor to move in either one direction or the other depending on the nature of the signal. In response to each secondary pulse transmitted thereto, the logic and amplifier unit 14a changes the state of energization of the windings of the motor 12a from one condition to the next condition in the sequence. Also, instead of the logic and amplifier units operating to energize the associated motor windings in one or another of two sequences, depending on the direction signal, to control the direction of rotation of the motors, the logic and amplifier units could be arranged to always energize the motor windings in the same sequence and the direction signal could be used to control one or more clutch controlled mechanical reversing mechanisms located between the motors and the driven part. In FIG. 1, the windings of the motors have been omitted for clarity, but the four lines leading to the motor from each logic unit are intended to represent the line by which the windings are energized.

From the foregoing, it will now be understood that not only are the windings of each motor energized in a step-by-step sequence, but also, the motors themselves are energized in a sequential manner as a result of the phase shift existing between the secondary trains. The net result of this, and the fact that the rotors of the motors are restrained to rotation in unison, is that the gear 34 or other final output member is rotated at a speed equal to only one fourth the speed which would be obtained by operation of a single one of the stepping motors directly by the primary pulse train, and the torque applied to the gear 34 or other final output member is increased by a factor of almost four.

Figure 3:
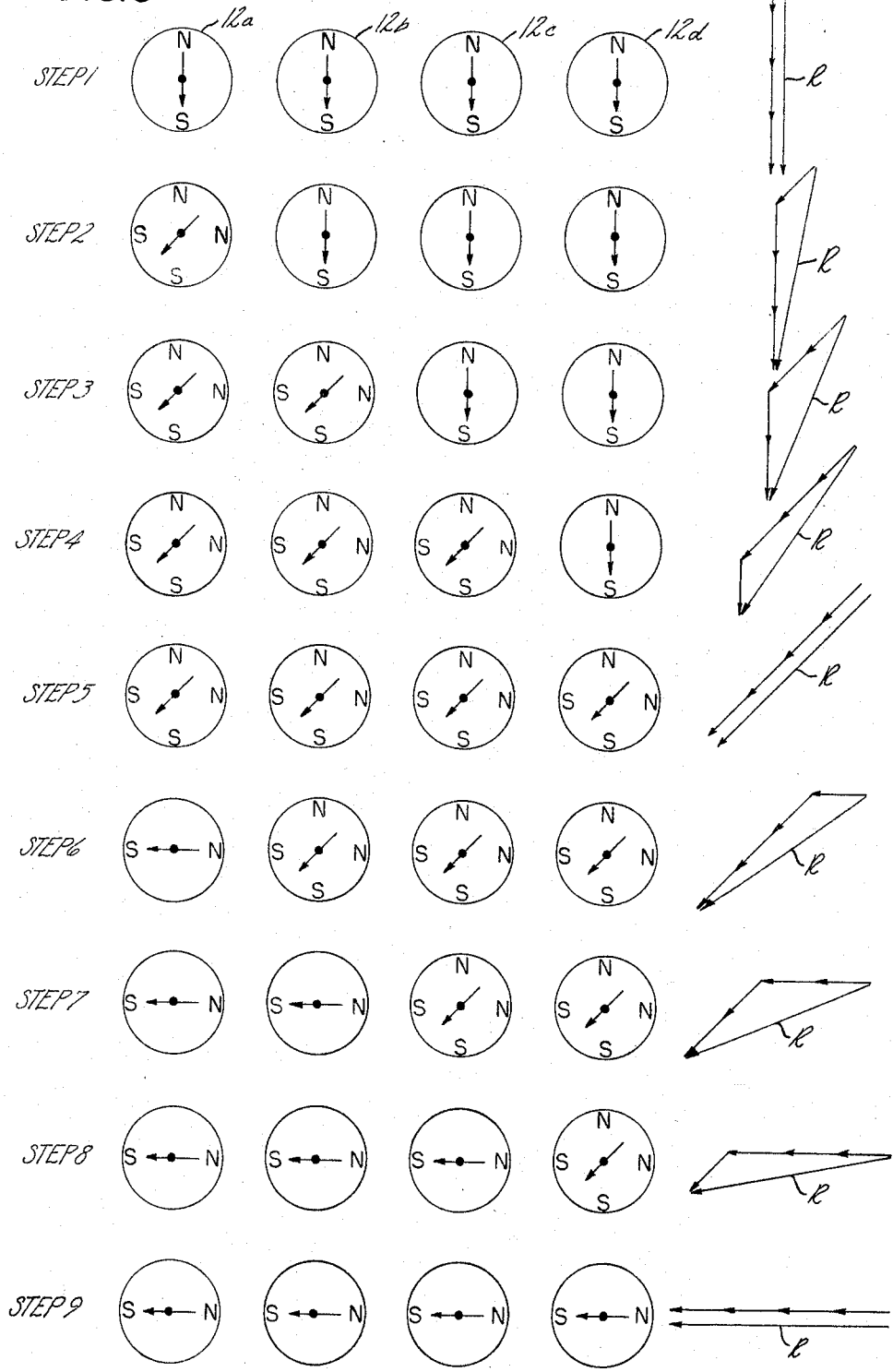
FIG. 3 is a schematic representation of the four stepping motors of the system of FIG. 1 and showing the motors in the different sequential states of energization which are gone through in driving the final output member of the system one quarter of a revolution.

The nature of the operation of the drive system may perhaps be best understood from FIG. 3 in which the motors 12a, 12b, 12c and 12d are represented in accordance with the same convention as used in FIG. 7. Each horizontal line shows the condition of the windings of the four motors for each step in the operation of the system. For an initial condition, step 1, the windings are energized so as to produce north and south poles at the twelve and six o'clock positions respectively of each motor, and as a result all of the rotors are urged to the vertical positions indicated by the arrows. To the right of the horizontal line of motors representing step 1, is a diagram, in the nature of a vector diagram, wherein the small arrows each represent a respective one of the rotors of the four motors. The length of each small arrow represents generally the magnetic force imposed on the rotor and the orientation of the arrow represents the position to which the rotor is urged by the energization of the associated stator windings. The large arrow labeled R is the resultant obtained by the addition of the small arrows and has a magnitude which represents in general the magnitude of the resultant of the forces imposed on the rotors and an orientation representing the actual orientation of the rotors. Since in step 1, all of the small arrows are oriented downwardly, the resultant R is also oriented downwardly. After the windings of the motors have been in the condition shown in step 1 for some time, a secondary pulse is received by the logic unit 14a which causes the windings of the motor 12a to be switched to the next step in their pattern of sequential energization. As a result, the rotor of the motor 12a is now urged clockwise to the position shown in step 2. However, due to the other motors remaining energized as shown, and due to the rotors being tied together for rotation in unison, the rotor of the motor 12a does not in actuality move completely to the position shown in step 2, and instead moves a lesser distance and pulls with it the rotors of the other three motors. The net result is that all of the rotors are moved to a new orientation as represented by the arrow R.

The next occurrence, step 3, is the receipt of a secondary pulse by the logic unit 14b, which shifts the condition of the windings of the motor 12b to the state shown. This time, the positions to which the rotors are urged added to cause the resultant or actual position R to shift slightly further in the clockwise direction. Following through with the pattern shown by FIG. 3, it will be noted that as further secondary pulses are in turn received by the motors 12c, 12d, 12a, 12b, etc., the state of energization of the windings are further changed and as a result of each change in energization, the resultant R is moved a step further in the clockwise direction. Further from FIG. 3, it will be noted that for the system shown eight steps are required to move the rotors a quarter of a revolution and that therefore, a total of thirty-two steps are required to move the rotors one full revolution, this to be compared with FIG. 7 wherein only eight steps are required to achieve one full revolution of the output shaft of a single stepping motor operating by itself. This is of considerable importance insofar as due to the time constant of the windings and other factors, the pulse frequency at which any one particular stepping motor may be operated is limited. Therefore, by using the present illustrated driving means, a train of primary pulses having a frequency as much as four times greater than the rated maximum frequency of each motor may be used with a resultant increase in the speed and power at which the driven part may be moved. By adding further stepping motors in accordance with the scheme of FIG. 1 still larger pulse frequencies may be used.

Figure 4:
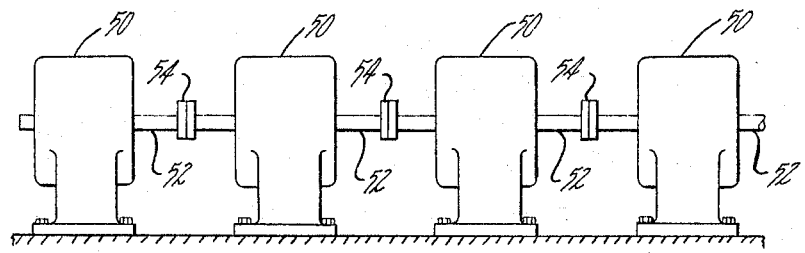
FIG. 4 is a schematic representation illustrating another way of joining the rotors of the various stepping motors to each other.
Figure 5:
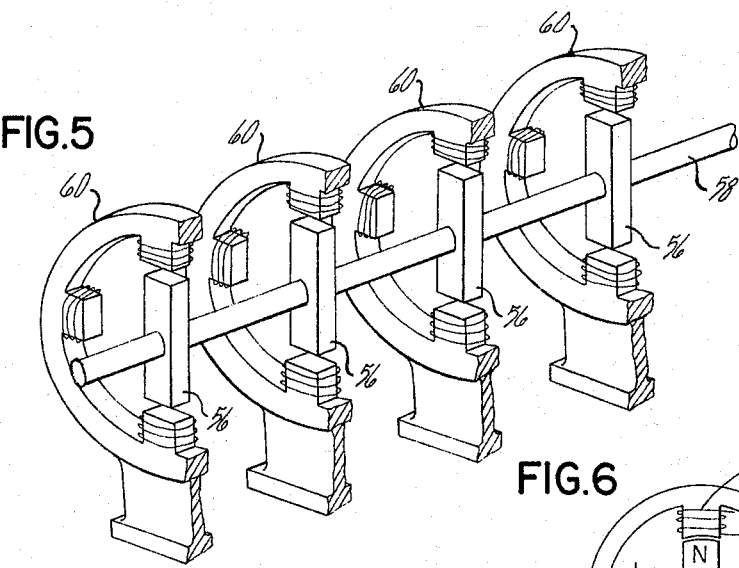
FIG. 5 is a schematic illustration showing still another way of joining the rotors of the various stepping motors to each other.
Figure 8:
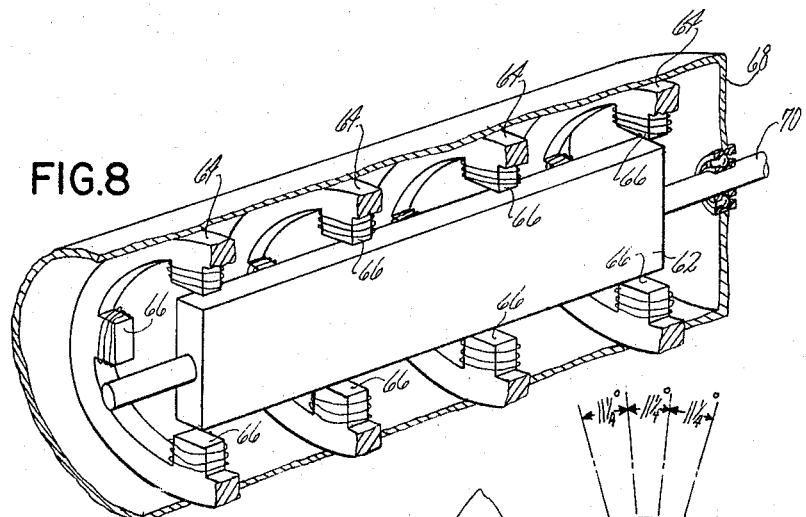
FIG. 8 is a schematic illustration of a stepping motor arrangement generally similar to that of FIG. 5 except for the stators being enclosed in a common housing and cooperating with a common rotor.

Another advantage of the stepping motor drive shown in FIG. 1 is that standard conventional stepping motors may be used as the motors illustrated at 12a, 12b, 12c and 12d. The rotors or output shafts of the various motors may also be joined in various different ways other than by the gear connection shown in FIG. 1. For example, as shown in FIG. 4, a number of stepping motors may be readily connected by coupling the output shafts of the motors together so that the shafts are aligned with one another for rotation about a common axis. In FIG. 4, four stepping motors are indicated generally at 50, 50, their output shafts at 52, 52, and couplings joining the shafts at 54, 54. Another manner of connecting the rotor is shown in FIG. 5 wherein the rotors, indicated at 56, 56, are mounted on a common shaft 58 for cooperation with four respectively associated stators 60, 60. With this arrangement, all of the rotors and stators could, if desired, be contained within one housing. Regardless of the manner of connecting the rotors, it should be noted that it is important that the stators and rotors be so arranged and the rotors so connected one to another that each rotor occupies substantially the same relative position with respect to its stator as do all other rotors with respect to their stators. That is, if all of the motors have their windings energized in the same manner as in step 1 or step 5 of FIG. 3, all of the rotors should be aligned with the effective north and south magnetic poles of their associated stators. From FIG. 5, it will also be obvious that if desired, the individual rotors 56, 56 could be replaced by a single elongated rotor of such axial length as to be simultaneously cooperable with each of the four annular series of stator poles provided by the four stators. Such an arrangement is shown in FIG. 8 wherein the reference numeral 62 represents a single elongated rotor and the reference numerals 64, 64 represent four individual stators each of which defines an annular series of stator poles 66, 66. The stators 64, 64 in this figure are shown mounted inside of a common housing 68 which also rotatably supports the rotor shaft 70 so that the four stators 64, 64 and rotor 62 form essentially a single motor. It will also be understood that in the stepping motors shown in FIG. 5 and FIG. 8, the stator poles need not be provided by a number of separate, axially spaced stators, as shown, but instead could be provided by a one-piece stator means or a by a stator means comprises of a lesser number of sections than the number of annular series of stator poles.

In the motors of FIGS. 5 and 8, the arrangement of the rotor poles and stator poles is such that when one annular series of stator poles has two or more poles fully aligned with a corresponding number of the associated rotor poles, the other series of stator poles also each have two or more poles fully aligned with a corresponding number of rotor poles. FIG. 3 portrays the steps involved in sequentially changing the energization of the windings of such a motor, and from inspecting the vector diagrams appearing at the right-hand side of this figure, the resultant R, which has a length proportional to the resultant magnetic force between the rotor and the stator poles varies in going from one step to another, the resultant R in FIG. 3, for example, being a maximum at steps 1, 5 and 9 of the illustrated sequence and being a minimum at steps 3 and 7. This variation in the resultant magnetic force also causes variations in the output torque.

This variation in the torque produced at different steps in the sequential energization pattern may be reduced, and if desired entirely overcome, by arranging the stator and rotor poles so that each series of stator poles is displaced from full alignment with its associated rotor poles by an angle different from that existing between the other series of stator poles and their associated rotor poles. This difference in the displacement of the poles may be accomplished either by maintaining the stator poles angularly aligned with one another and angularly offsetting the rotor poles from one another or by maintaining the rotor poles angularly aligned and by angularly offsetting the stator poles. As a third alternative, both of the stator poles and the rotor poles could be angularly misaligned. As an example of this, FIG. 9 shows an end view of a stepping motor which is identical with that shown in FIG. 5 except for the rotors 56a, 56b, 56c and 56d being angularly offset from each other on their supporting shaft 58.

The amount of angular offset between the successive sets of poles is dependent on the number of sets of poles, the number of degrees of rotor shaft movement obtained with each step or change in the energization in the winding means when one winding means in energized independently of the energization of the other winding means, and the degree of uniformity of torque desired. When it is desired to maintain the torque at an exactly uniform value, the difference in the angular spacing between the sets of rotor poles should be equal to the amount of movement effected by a step change in the energization of a single winding means when such winding means operates by itself divided by the number of series of stator poles. For example, in FIG. 9, the illustrated motor is such that, as dicussed in connection with FIGS. 6 and 7, for each step change in the energization of one winding means operating by itself the rotor rotates 45°. Since there are four series of stator poles, the angular spacing between successive rotor poles should be 45°/4 or 11¼°, as illustrated in FIG. 9, in order that the torque imposed on the shaft 58 for each step of the energization sequence remains constant.

The arrangement of the stator and rotor poles necessary to obtain a uniform torque may be expressed more generally by the equation $(C_i - C_{i-1}) = a/n$, where $a$ equals the angular movement of the rotor obtained with each change in the energization of the winding means when one winding means is energized independently of the energization of the other winding means, $n$ equals the number of series of stator poles, and $C_i$ equals the angular displacement of the $i$th series of stator poles from full alignment with the associated rotor poles.

Figure 9:
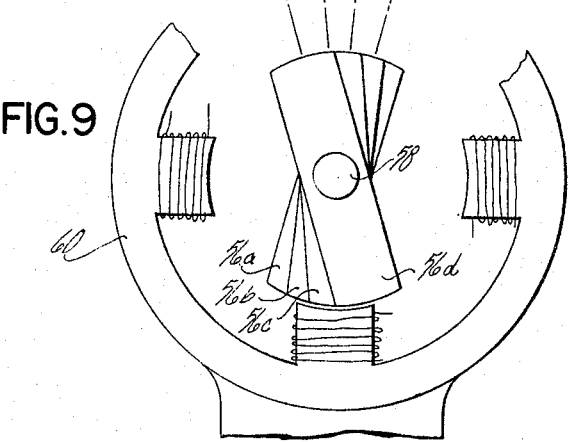
FIG. 9 is a schematic illustration of a stepping motor arrangement generally similar to that of FIG. 5 except for the rotors having their poles angularly displaced by differing amounts from the associated stator poles.
Figure 10:
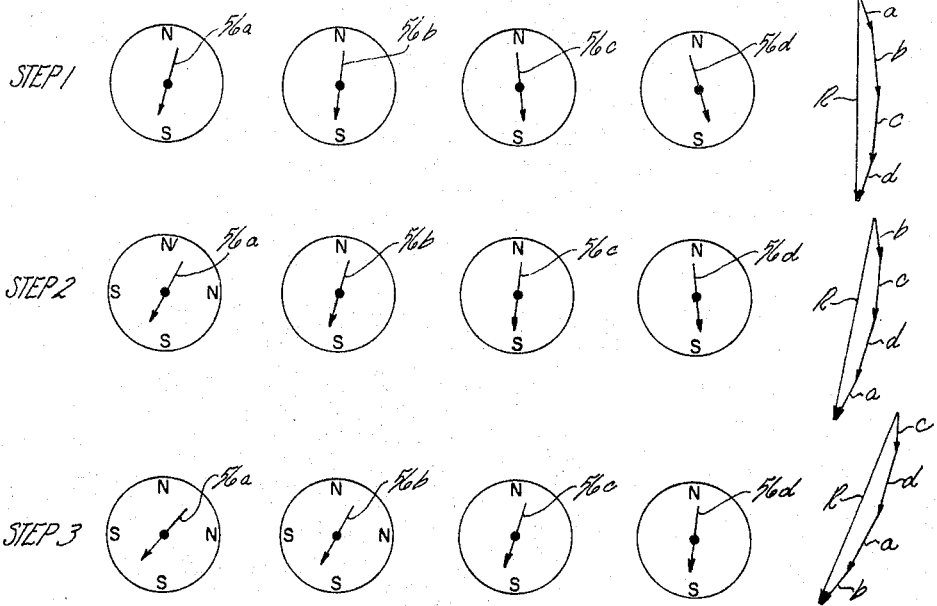
FIG. 10 is a schematic representation portraying three successive states of energization of the coils of the stepping motor arrangement of FIG. 9.

The effects of this spacing of the rotor and stator poles is shown in FIG. 10 which portrays three steps in the energization of the winding of the motor of FIG. 9. The diagram of FIG. 10 is generally similar to that of FIG. 3, except that in FIG. 10 the arrows in the circles indicate the actual position of the rotors 56a, 56b, 56c and 56d instead of indicating the positions toward which the rotor is urged. In the vector diagrams appearing in the right of the figure, however, the arrows $a$, $b$, $c$ and $d$ represent the magnetic forces existing between the individual rotors and the associated stator poles. The rotors 56a and 56d in step 1 for example are further spaced from the effective magnetic poles produced by the associated stator poles than the rotors 56b and 56c and therefore have less magnetic force exerted thereon than the latter rotors. In following through from step 1 to step 2 to step 3, it will become apparent that as the sequential pattern is carried on, the vector diagrams change in such a manner as to cause only rotation of the resultant R without changing its length, and according without the changing the torque imposed on the rotor shaft. If the angular spacing between successive sets of poles is changed to a value greater than the value $a/n$, the resultant torque again varies from step to step; therefore, the desirable range for the angular spacing is any spacing falling between zero spacing, such as shown by the motors of FIGS. 5 and 8, and the spacing of $a/n$, such as shown by FIG. 9.

The invention claimed is:

1. A stepping motor drive comprising a plurality of stepping motors each having a stator and a rotor and windings which windings are energizable in a step-by-step sequence to urge the associated rotor to move a given angular distance as the energization of said windings is changed from any one step to the next following step in said sequence, and so that each of said motors is capable of continuously operating independently of the other of said motors in response to its windings being energized in said step-by-step sequence, means for generating a primary train of electrical pulses, means for converting said primary train of pulses into a number of trains of secondary pulses with the number of said secondary trains being equal to the number of said stepping motors and with the pulses of said secondary trains being phase shifted from each other by phase angles substantially equal to 360° divided by the number of said secondary trains, a plurality of logic means each associated with a respective one of said secondary trains of pulses and with a respective one of said motors for energizing the windings of said motor in accordance with said step-by-step sequence and to change the energization from one step to the next step in response to each pulse of its associated secondary train of pulses, an output member, and means drivingly connecting each of said rotors to said output member so that said output member and all of said rotors move in unison.

2. A stepping motor drive as defined in claim 1 further characterized by each of said rotors having substantially the same orientation relative to its stator as do all other of said rotors to their stators.

3. A stepping motor drive comprising a plurality of rotors, means connecting said rotors for rotation in unison, a plurality of stators each associated with a respective one of said rotors to form a plurality of stator and rotor pairs, a plurality of sets of windings each of which sets is associated with a respective one of said stator and rotor pairs, each of said stator and rotor pairs and the associated sets of windings being so constructed and arranged that the state of energization of said associated set of windings may be switched in a step-by-step sequence to urge the associated rotor to move a given angular distance as the energization of said associated set of windings is changed from any one step to the next following step in said sequence and so that each of said rotors may be caused to continuously rotate solely by its set of windings having its state of energization changed in said step-by-step sequence while said sets of windings of the other of said rotor and stator pairs remain unenergized, and means for switching the states of energization of said sets of windings in a sequential manner relative to one another so that the state of energization of only one of said sets of windings is switched at any one time.

4. A stepping motor drive as defined in claim 3 further characterized by said means for switching the states of energization of said sets of windings comprising means for generating a primary train of electrical pulses, means for converting said primary train of pulses into a number of trains of secondary pulses with the number of said secondary trains being equal to the number of said sets of windings and with the pulses of said secondary trains being phase shifted from each other by phase angles substantially equal to 360° divided by the number of said secondary trains, a plurality of logic means each associated with a respective one of said secondary trains of pulses and with a respective one of said sets of windings for switching the energization of the associated sets of windings from one state to another in said step-by-step sequence in in response to each pulse of its associated secondary train of pulses.

5. A stepping motor drive as defined in claim 3 further characterized by each of said sets of windings comprising a number of separate windings located on the associated stator and which windings are selectively energizable in one or another of two sequential switching patterns to urge the associated rotor to move in a step-by-step fashion in one or the other direction of rotation.

6. A stepping motor drive comprising a stator having a number of annular series of stator poles with the poles of each series being arranged about a common axis and with each series of poles being spaced along said common axis from adjacent series, a rotor rotatable about said common axis and having a number of poles fixed relative to one another and cooperable with the poles of each of said series of stator poles, and a number of sets of windings each associated with a respective one of said series of stator poles and each of which winding means may be switched between different states of energization in accordance with a predetermined sequential pattern to urge said rotor means to rotate in a step-by-step fashion, each of said series of stator poles and said rotor poles and the associated set of windings being so constructed and arranged that said rotor may be caused to continuously rotate solely by one of said sets of windings having its state of energization changed in said sequential pattern while the other of said sets of windings remain unenergized, and means for switching of the states of energization of said sets of windings in such a manner that each set of windings has its state of energization changed in accordance with said predetermined sequence and so that among said sets of windings the switching occurs in sequence so that the state of energization of only one set of windings is changed at any one time.

7. A stepping motor drive as defined in claim 6 further characterized by said rotor poles each being of such a length as to be cooperable with each of said series of stator poles.

8. A stepping motor drive as defined in claim 6 further characterized by said rotor poles and said stator poles being so arranged that for any position of said rotor each of said series of stator poles has a different angular displacement relative to the associated rotor poles, said arrangement of said stator and rotor poles being such that when $a$ = the angular movement of the rotor obtained with each change in the state of energization of one set of windings when said one set of windings is energized independently of the energization of the other sets of windings, $n$ = the number of series of stator poles, and $C_i$ = the angular displacement of the $i$th series of stator poles from full alignment with the associated rotor poles, the difference in said angular displacement between successive series of stator poles $(C_i - C_{i-1})$ is approximately equal to $a/n$.

9. A stepping motor drive as defined in claim 6 further characterized by the arrangement of said stator and rotor poles being such that when $a$ = the angular movement of the rotor obtained with each change in the state of energization of one set of windings when said one set of windings is energized independently of the energization of the other sets of windings, $n$ = the number of series of stator poles, and $C_i$ = the angular displacement of the $i$th series of stator poles from full alignment with the associated rotor poles, the difference in said angular displacement between successive series of stator poles $(C_i - C_{i-1})$ is within the range of 0 to approximately $a/n$.

10. A stepping motor comprising a stator having a number of series of stator poles, the poles of each series being arranged about a common axis and said series being spaced along said axis, a rotor supported for rotation about said axis and having a number of poles fixed relative to one another and cooperable with the poles of each of said series of stator poles, and a number of sets of windings each associated with a respective one of said series of stator poles and each of which winding means may be switched between different states of energization in accordance with a predetermined sequential pattern to urge said rotor means to rotate in a step-by-step fashion, each of said series of stator poles and said rotor poles and the associated set of windings being so constructed and arranged that said rotor may be caused to continuously rotate solely by one of said sets of windings having its state of energization changed in said sequential pattern while the other of said sets of windings remain unenergized.

11. A stepping motor as defined in claim 10 further characterized by the arrangement of said stator and rotor poles being such that when $a$ = the angular movement of the rotor obtained with each change in the state of energization of one set of windings when said one set of windings is energized independently of the energization of the other sets of windings, $n$ = the number of series of stator poles, and $C_i$ = the angular displacement of the $i$th series of stator poles from full alignment with the associated rotor poles, the difference in said angular displacement between successive series of stator poles $(C_i - C_{i-1})$ is approximately equal to $a/n$.

12. A stepping motor as defined in claim 10 further characterized by the arrangement of said stator and rotor poles being such that when $a$ = the angular movement of the rotor obtained with each change in the state of energization of one set of windings when said one set of windings is energized independently of the energization of the other sets of windings, $n$ = the number of series of stator poles, and $C_i$ = the angular displacement of the $i$th series of stator poles from full alignment with the associated rotor poles, the difference in said angular displacement between successive series of stator poles $(C_i - C_{i-1})$ is within the range of 0 to approximately $a/n$.

13. A stepping motor drive comprising a plurality of stepping motor devices, each of said devices including a rotor and means for rotating said rotor through a number of angular steps in response to a corresponding number of time-spaced electrical pulses applied to said device, said rotor and said means for rotating said rotor for each of said stepping motor devices being so constructed and arranged that the associated rotor may be caused to continuously rotate solely by the application thereto of a continuous series of time-spaced electrical pulses while no such pulses are applied to any other of said stepping motor devices, means connecting the rotors of said stepping motor devices to one another for rotation in unison, and means for applying time-spaced electrical pulses to said stepping motor devices in sequence so that only one of said stepping motor devices receives an electrical pulse at any one time.

14. A stepping motor drive as defined in claim 6 further characterized by said rotor poles being constantly magnetically polarized in the same direction, and the set of windings associated with each series of stator poles being so arranged that when said associated set of windings is energized in said step-by-step sequence each stator pole of said series is first magnetically polarized in one direction and then in the opposite direction.

References Cited by the Examiner

UNITED STATES PATENTS

| | | | |
|---|---|---|---|
| 2,215,646 | 9/1940 | Kahns | 318—45 X |
| 2,340,875 | 2/1944 | Gibbs | 318—341 |
| 2,523,503 | 9/1950 | Fairbanks | 318—8 |
| 2,578,648 | 12/1951 | Thomas | 318—345 X |
| 2,791,734 | 5/1957 | Kieffert | 318—341 X |
| 2,796,571 | 6/1957 | Dunn | 318—341 X |
| 2,797,346 | 6/1957 | Ranseen. | |
| 2,808,556 | 10/1957 | Thomas | 318—45 X |
| 3,089,069 | 5/1963 | Thomas | 310—49 X |
| 3,117,268 | 1/1964 | Madsen | 310—49 |
| 3,136,698 | 6/1964 | Mann | 318—8 X |
| 3,146,386 | 8/1964 | Gerber | 310—49 X |

FOREIGN PATENTS

| | | |
|---|---|---|
| 248,318 | 6/1956 | Switzerland. |
| 1,124,093 | 6/1956 | France. |

ORIS L. RADER, *Primary Examiner.*

T. LYNCH, *Assistant Examiner.*